Figure 1:
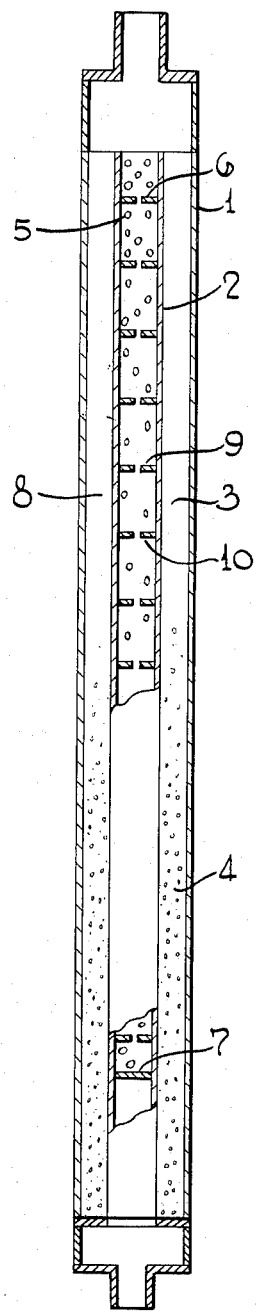
Figure 2:
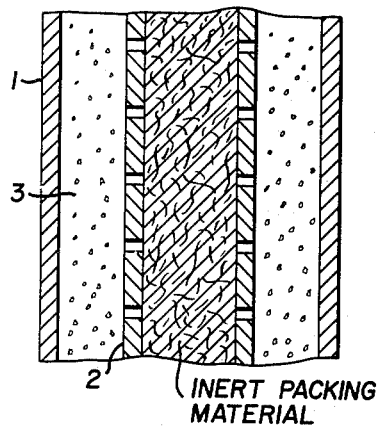
Figure 3:
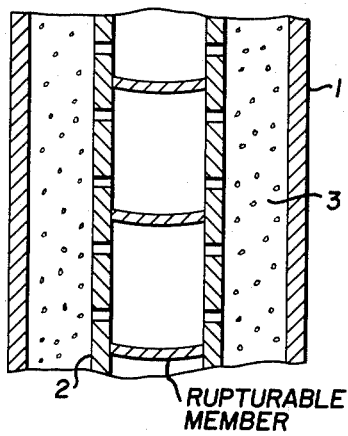
Figure 4:
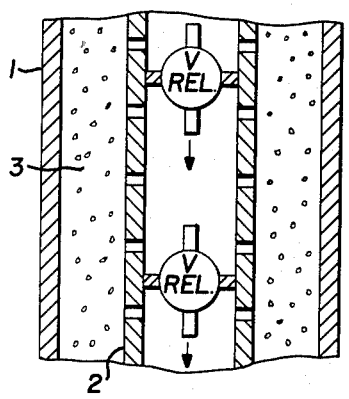
Figure 5:
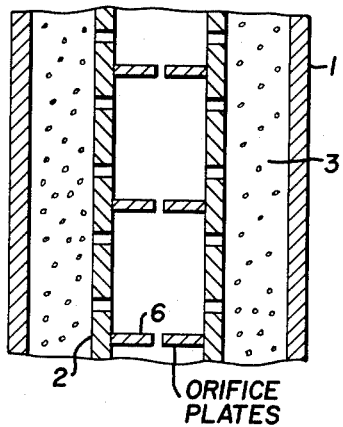

July 3, 1956  J. E. IDENDEN ET AL  2,753,249
CATALYTIC POLYMERIZATION APPARATUS

Filed Oct. 6, 1950

2 Sheets—Sheet 1

John E. Idenden
Lyman J. Parrigin  Inventors
By W. O. T Heilman  Attorney

July 3, 1956 — J. E. IDENDEN ET AL — 2,753,249
CATALYTIC POLYMERIZATION APPARATUS
Filed Oct. 6, 1950 — 2 Sheets-Sheet 2

INERT PACKING MATERIAL

RUPTURABLE MEMBER

ORIFICE PLATES

John E. Idenden
Lyman J. Parrigin
Inventors

By W. O. Teilman, Attorney

United States Patent Office 2,753,249
Patented July 3, 1956

2,753,249

CATALYTIC POLYMERIZATION APPARATUS

John E. Idenden, Belleville, and Lyman J. Parrigin, Metuchen, N. J., assignors to Esso Research and Engineering Company, a corporation of Delaware Application October 6, 1950, Serial No. 188,668

5 Claims. (Cl. 23—288)

This invention relates to the type of process known as a catalytic polymerization process. In particular, the invention concerns apparatus well adapted for the conduct of this process. At the same time, it is to be understood that the apparatus of this invention is applicable or may be adapted to a wide variety of other processes. As a consequence, the description of this apparatus with particular reference to a catalytic polymerization process will be by way of example rather than limitation.

The catalytic polymerization process is commonly used in the petroleum refining industry at the present time for converting light olefinic hydrocarbons such as propylene, butylenes and amylenes into high octane blending agents for motor gasoline. A number of catalysts may be employed in the polymerization process including those made from silica-alumina and those of copper pyrophosphate. However, the generally preferred catalyst at the present time consists of kieselguhr clay which is impregnated with phosphoric acid and is formed into small cylinders by extrusion.

In view of the fact that the polymerization reaction is highly exothermic, and since control of the reaction temperature is very important as affecting catalyst life and polymer quality, modern polymer plants generally employ tubular reactors surrounded by jackets to permit temperature control. Thus, the catalyst is placed in a number of tubes generally arranged in the form of tube bundles, which are placed in a suitable jacket to permit maintaining a steam condensate around the tubes of the bundle. The steam jacket surrounding the tubes removes the heat of reaction developed during polymerization and controls the reactor temperature. It is generally preferred to conduct the process at pressures of about 300 to 1200 pounds per square inch and at temperatures of about 350 to 500° F.

A difficulty in conducting the polymerization process in the manner described, arises from plugging of the catalyst bed supported in the tubular reactor. Thus, as the polymerization reaction proceeds in a tube filled with fresh catalyst, after a time, carbon or polymer formation at a localized point or points in the catalyst bed will occur so as to substantially plug the reactor tube. This plugging is localized for the reason that points of high temperature known as "hot spots" are to be found along the length of a given reactor tube. The high temperatures existing at the localized "hot spots" result in the formation of high molecular weight polymers which may carbonize at the high temperatures existing. This carbon formed on the catalyst is extensive enough to provide regions of extremely high pressure drop in the catalyst bed so as to cause the plugging referred to. Once initiated, the plugging of a reactor tube is a progressive phenomenon, since the reactor tubes in a given reactor bundle are arranged in parallel. As a result, on the initiation of plugging in a given reactor tube, the flow of feed materials through this tube will be decreased so as to provide longer residence time for the remaining material passing through the tube and so as to permit formation of more carbon.

It is apparent that when a reactor tube becomes plugged in this manner, the tube is of little further value. Again, when several of the tubes of a reactor system have become so plugged, it is apparent that use of the particular reactor must be discontinued. It is the principal purpose of this invention to minimize the effect of this plugging and to extend the life of the reactor as a whole.

In accordance with this invention, a tubular reactor of the type indicated is provided with a bypass tubular member. It is most simple and effective to position the bypass tubular member at the center of the tubular reactor so that the catalyst may be supported in the annular space between the bypass tubular member and the tubular reactor. The bypass tubular member is provided with means along its length to provide a substantial pressure drop. In addition, the bypass tubular member is provided with perforations so that fluid may pass through the walls of the bypass tubular member. As a consequence of this arrangement, fluid introduced into the reactor system indicated, will normally pass through the catalyst bed in the annular space provided. This flow will occur for the reason that the pressure drop in the bed of catalyst will normally be smaller than the pressure drop in the tubular bypass member. However, at whatever time plugging of the catalyst bed at localized points occurs, the fluid flow will be preferentially passed into the tubular by-pass member. The fluid by-passed by virtue of the plugging of the catalyst bed will pass along the tubular bypass member until an unplugged portion of the catalyst bed is reached, at which time the fluid will again preferentially pass through the catalyst bed. In this manner the fluid will automatically bypass localized plugged portions of the catalyst bed.

The nature of this invention may be better understood by reference to the accompanying drawings referred to in the following description of one embodiment of this invention. Fig. 1 illustrates a single reactor tube while Figs. 2 to 5 inclusive, illustrate structural details of Fig. 1. Referring to Fig. 1, a single reactor tube 1, is illustrated. While only one tube is illustrated, in actual use, a great many of these tubes would be employed which, as indicated, are generally formed in the arrangement of a tube bundle placed within a jacket or as pairs of tubes placed within a jacket. A suitable reactor tube may be about 2" to 5" in diameter and is generally about 24 to 30 feet in length. In accordance with this invention, a central tubular member 2 is inserted in the tubular reactor 1. The diameter of the inner tube 2 is generally a small fraction of the diameter of the outer tube 1 so as to provide an appreciable annular space 3 between the outer wall of tube 2 and the inner wall of tube 1. For example a ½" diameter bypass tube may be employed in a 5" diameter reactor tube. The annular space 3 is filled with a suitable polymerization catalyst which, as indicated, may be in the form of cylindrical catalyst pills 4. In accordance with this invention, the walls of the inner tube 2 are provided with a great many perforated openings 5. As will be apparent, it is essential that these openings be sufficiently numerous and sufficiently large so that the total fluid flow to be applied to the particular reactor tube 1 may pass through the perforate openings 5 provided in a short length of the tube 2 without appreciable pressure drop. Two holes per inch having a diameter of about ¼" may be used in a polymerization reaction. The inner tube 2 is further provided with orifices 6 positioned at short intervals along the length of the tube. These orifices are selected to provide a desired pressure drop. In the case in which the reactor is to be employed as a polymerization reactor, it is suitable to position the orifices at about every two feet along the length of the inner tube 2 provided the orifices are of a nature to provide a pressure drop of about 10 pounds per square inch at the rate of fluid flow corresponding to the total fluid input to the reactor tube. Orifices of about ¼" diameter are suitable.

It is preferred that tube 2 should be terminated or plugged off completely as by means of the blank 7 positioned at a distance of about 6 ft., for example, from the bottom or exit end of the reactor.

The manner in which the apparatus illustrated operates may now be appreciated. A suitable polymerization feed stock such as a hydrocarbon fluid rich in $C_2$, $C_3$, $C_4$, $C_5$ or $C_6$ olefins, generally $C_3$ and/or $C_4$ olefins, may be introduced to the upper end of tube 1. Due to the presence of the orifices 6 in tube 2, imposing a high pressure drop on fluid passing through tube 2, the feed polymerization fluid will substantially pass through the annular space or through the catalyst bed provided between tubes 1 and 2. However, when the reaction has proceeded sufficiently long for plugging to occur at a particular point in the bed, as, for example, in the portion of the bed indicated by numeral 8 between the particular orifices 9 and 10, fluid will begin to preferentially bypass this plugged portion of the bed by passing through the perforations of the tube 2 and by flowing downwardly through tube 2. However, when the fluid has flowed through tube 2 to a point in the reactor below the plugged portion 8, the greater pressure drop imposed on fluid flowing through tube 2 would cause preferential passage of the fluid through the perforations of tube 2 back to the catalyst bed. In this manner, it is apparent that the fluid will preferentially and automatically bypass plugged portions of the reactor. As a consequence, the life of a given reactor tube will not be limited by localized plugging in the tube but will be greatly extended. It is apparent that in the apparatus as described, a portion of the feed polymerization fluid will inherently pass through the inner tube 2 at all times. For this reason, the blank 7 is preferentially positioned near the outgoing end of the reactor so that any fluid which has passed through tube 2, avoiding contact with the catalyst, will necessarily be forced through the bed of catalyst adjacent to the exit end of the reactor.

It is apparent that the general apparatus described may be modified in many ways. For example, means other than orifices may be employed to provide the required pressure drop in the inner bypass tube 2. For example, a simple type of valve may be substituted for the orifices 6 along the length of the tube 2. The valves employed, may be spring loaded valves selected so that the valves will not open unless a particular pressure drop exists. For example, the valves may be selected so that they will remain closed until a pressure drop of about 10 pounds per square inch exists in a portion of tube 2. In this manner the valves will operate similarly to the orifices described except that bypassing of fluid at low flow rates is impossible.

Again the desired pressure drop in the inner bypass tube 2 may be provided by positioning a suitable packing material in the tube 2. This packing material is preferably an inert packing of any desired character of a nature to provide a pressure drop along tube 2 somewhat more than the normal pressure drop through the bed of catalyst maintained in the annular space.

A still further alternative is to employ rupture discs in place of the orifices indicated. These discs will be chosen so as to break when plugging of a portion of the catalyst bed has proceeded to an appreciable extent.

As described therefore, this invention concerns a novel type of reactor. The reactor is adapted to the conduct of any reaction process employing a catalyst subject to plugging during the conduct of the particular reaction. To avoid plugging difficulties, it is the concept of this invention to provide a bypass line along the length of the reactor open to fluids passing through the reaction bed as by means of perforations. The bypass line is provided with any desired element to provide a pressure drop in the bypass line greater than the normal pressure drop existing in the reactor proper. As a consequence of this arrangement, localized plugging in the reactor as it affects the usable life of the reactor is substantially overcome.

What is claimed is:

1. An apparatus comprising an elongated tubular reactor, an elongated tubular bypass member concentrically disposed within said reactor and spaced radially therefrom to form an annular reaction zone therebetween, means for introducing a fluid within one end of said reaction zone, means for withdrawing the fluid from the opposite end of said reaction zone, a plurality of flow restriction means spaced along the length of the interior of the bypass member to preferentially direct flow of the fluid through the length of the reaction zone, and a plurality of fluid intercommunication means positioned at a plurality of points spaced longitudinally along said reaction zone and said bypass member to enable the flowing fluid to bypass portions of said reaction zone which become plugged.

2. An apparatus as defined in claim 1 in which each flow restriction means is a transverse plate provided with at least one orifice.

3. An apparatus as defined in claim 1 in which the flow restriction means consists of an inert packing material.

4. An apparatus as defined in claim 1 in which each flow restriction means is pressure rupturable member.

5. An apparatus as defined in claim 1 in which the bypass member is terminated by fluid-impervious closure means.

References Cited in the file of this patent

UNITED STATES PATENTS

| | | |
|---|---|---|
| 2,252,719 | McCausland | Aug. 19, 1941 |
| 2,257,178 | Martin et al. | Sept. 30, 1941 |
| 2,315,208 | Kinnaird | Mar. 30, 1943 |
| 2,338,345 | Mather | Jan. 4, 1944 |
| 2,354,640 | Becker | July 25, 1944 |
| 2,369,478 | Mekler et al. | Feb. 13, 1945 |
| 2,521,538 | Rees | Sept. 5, 1950 |

FOREIGN PATENTS

| | | |
|---|---|---|
| 273,045 | Great Britain | June 30, 1927 |